(12) United States Patent
Nakagawa

(10) Patent No.: US 10,024,959 B2
(45) Date of Patent: Jul. 17, 2018

(54) TRACKING PROCESSING DEVICE AND TRACKING PROCESSING METHOD

(71) Applicant: FURUNO Electric Company Limited, Nishinomiya, Hyogo (JP)

(72) Inventor: Kazuya Nakagawa, Nishinomiya (JP)

(73) Assignee: FURUNO ELECTRIC COMPANY LIMITED, Nishinomiya (JP)

( * ) Notice: Subject to any disclaimer, the term of this patent is extended or adjusted under 35 U.S.C. 154(b) by 783 days.

(21) Appl. No.: 14/056,310

(22) Filed: Oct. 17, 2013

(65) Prior Publication Data

US 2014/0118187 A1    May 1, 2014

(30) Foreign Application Priority Data

Oct. 29, 2012 (JP) .................................. 2012-237775

(51) Int. Cl.
   *G01S 13/66* (2006.01)
   *G01S 7/41* (2006.01)
   *G01S 13/72* (2006.01)

(52) U.S. Cl.
   CPC .............. *G01S 13/66* (2013.01); *G01S 7/41* (2013.01); *G01S 13/726* (2013.01)

(58) Field of Classification Search
   CPC .......... G01S 13/66; G01S 13/726; G01S 7/41
   See application file for complete search history.

(56) References Cited

U.S. PATENT DOCUMENTS

| | | | | |
|---|---|---|---|---|
| 3,270,340 A | * | 8/1966 | Hammack | G01S 13/003 342/103 |
| 4,062,012 A | * | 12/1977 | Colbert | G01S 7/2922 342/90 |
| 8,816,895 B2 | * | 8/2014 | Young | G01S 7/412 342/118 |
| 2007/0008210 A1 | * | 1/2007 | Kibayashi | G01S 13/931 342/70 |

(Continued)

FOREIGN PATENT DOCUMENTS

| | | |
|---|---|---|
| JP | 61-186877 A | 8/1986 |
| JP | 2000-298169 A | 10/2000 |

(Continued)

*Primary Examiner* — Matthew M Barker
(74) *Attorney, Agent, or Firm* — Studebaker & Brackett PC

(57) ABSTRACT

There are provided a tracking processing device and a tracking processing method with which time lag from the receipt of a command to track a target until the movement state of this target is estimated more accurately can be reduced, the calculation burden can be reduced, and the memory capacity can be reduced. A tracking processing device 3 has an echo detector 9 and a tracking processor 11. The tracking processor 11 includes a characteristic information memory 41. The echo detector 9 detects information on tracking representative points P for one or more targets. The characteristic information memory 41 stores the information on the tracking representative points P at a plurality of time-points. The tracking processor 11 tracks the tracking target selected from among a number of targets. The tracking (Continued)

processor 11 uses information stored in a characteristic information memory 41 to estimate an estimated speed vector $V5(n)$ for this tracking target at the start of tracking of the tracking target.

6 Claims, 12 Drawing Sheets

(56) References Cited

U.S. PATENT DOCUMENTS

2014/0022110 A1\* 1/2014 Itohara .................... G01S 7/295
342/107

FOREIGN PATENT DOCUMENTS

| JP | 2000-304853 A | 11/2000 |
| JP | 2001-056375 A | 2/2001 |
| JP | 2003-048595 A | 2/2003 |
| JP | 2003-329770 A | 11/2003 |
| JP | 2003-329771 A | 11/2003 |

\* cited by examiner

| | |
|---|---|
| Distance rp | ~202 |
| End angle θe | ~203 |
| Angle width θw | ~204 |
| Nearest edge distance rn | ~205 |
| Farthest edge distance rf | ~206 |
| Area ar | ~207 |
| Tracking representative point P | ~208 |
| Shape information | ~209 |
| Echo level | ~210 |
| Echo peripheral information | ~211 |
| Doppler shift amount | ~212 |
| Clock time | ~213 |

FIG.3

Processing by second processor

Processing by second processor

Processing by second processor

Processing by second processor

Result of Processing by second processor

Result of Processing by third processor ized operation using a radar antenna. The radar signal includes data that specifies the positions of a plurality of targets. The obtained radar signal is outputted to a tracking device. The tracking device estimates movement of a tracking target at the current scan time-point by using the results of predicting the movement of a tracking object in the past, and position information about the target included in the latest radar signal.
TRACKING PROCESSING DEVICE AND TRACKING PROCESSING METHOD

CROSS-REFERENCE TO RELATED APPLICATIONS

This application claims priority to Japanese Patent Application No. 2012-237775 filed on Oct. 29, 2012. The entire disclosure of Japanese Patent Application No. 2012-237775 is hereby incorporated herein by reference.

BACKGROUND

Field of the Invention

The present invention relates to a tracking processing device and a tracking processing method used in the tracking processing of targets.

Background Information

There is a known tracking device that tracks a target (TT: target tracking) by using a radar signal reflected by the target (see Japanese Laid-Open Patent Application No. S61-186877 (Patent Literature 1), paragraphs [0006] and [0007] of Japanese Laid-Open Patent Application No. 2001-56375 (Patent Literature 2), paragraph [0028] of Japanese Laid-Open Patent Application No. 2003-48595 (Patent Literature 3), claim 1 of Japanese Laid-Open Patent Application No. 2003-329770 (Patent Literature 4), paragraph [0034] of Japanese Laid-Open Patent Application No. 2003-329771 (Patent Literature 5), and claim 1 of Japanese Laid-Open Patent Application No. 2000-304853 (Patent Literature 6), for example). The radar signal is obtained by a scanning operation using a radar antenna. The radar signal includes data that specifies the positions of a plurality of targets. The obtained radar signal is outputted to a tracking device. The tracking device estimates movement of a tracking target at the current scan time-point by using the results of predicting the movement of a tracking object in the past, and position information about the target included in the latest radar signal.

The configuration discussed in Patent Literature 1 involves storing the positions of tracking objects. The configuration discussed in Patent Literature 1 also involves searching for the positions of targets that can be paired with a selected target. The configuration discussed in Patent Literature 1 further involves calculating a predicted position for all of the targets that can be paired.

The configuration discussed in Patent Literature 2 involves performing foreground tracking and background tracking. "Foreground tracking" is tracking a target in a state in which it is displayed on a display device that this is a tracking object. "Background tracking" is tracking a target in a state in which it is not displayed on a display device that this is a tracking object. The configuration discussed in Patent Literature 2 involves receiving a command to display a background tracking object as the tracking object on a display device. When this command is received, the background tracking object is switched to the foreground tracking object.

The configuration discussed in Patent Literature 3 involves simultaneously tracking a plurality of targets. The configuration discussed in Patent Literature 3 involves displaying the tracking results for those targets with at least a preset importance out of the plurality of targets.

The target tracking device discussed in Patent Literature 4 comprises a hypothesis production means and a hypothesis selection means. The hypothesis production means goes back from the start of tracking to a past observation time-point and takes in observation information related to the position of a tracking object along a time series. The hypothesis production means then produces a hypothesis group. The hypothesis group indicates a combination of wakes predicted at each observation time-point until the time-point when tracking of the tracking object begins. The hypothesis selection means selects a hypothesis including the wake with the highest reliability from the hypothesis group, as the hypothesis to be used in tracking processing after the start of tracking of the tracking object.

The tracking device discussed in Patent Literature 5 involves predicting the point of impact of a target. More specifically, a variance-covariance matrix and a smooth vector used in tracking processing are calculated back over the past. This improves the accuracy of the initial value of point of impact prediction.

The tracking device discussed in Patent Literature 6 comprises a storage means, an information acquisition means, an estimation means, and a prediction means. The storage means stores detection information for the tracking object prior to the start of tracking, in time series. The information acquisition means uses the detection information to obtain movement information about the tracking object at the start of tracking. The estimation means estimates the path of the tracking object prior to the start of tracking, based on the movement information. The prediction means predicts movement of the tracking object at the start of tracking, based on the predicted path.

SUMMARY

Usually, when a tracking object is specified from among a plurality of targets, the tracking device starts tracking this tracking object. However, a tracking device does not usually hold movement information about the tracking object at the start of tracking of the tracking object. This makes it difficult for the tracking device to accurately estimate the movement state of the tracking object at the start of tracking of the tracking object. To deal with this, for example, the tracking device observes the movement of the tracking object over a plurality of scans, and starts tracking processing based on the observation result. Consequently, the movement state of the tracking object is displayed on a display screen. In this case, there is a time lag after the command to start tracking the tracking object, until the movement state of the tracking object is displayed on the display screen.

The configurations in Patent Literature 2 and 3 involves tracking a plurality of targets, and displaying only the specified target out of the plurality of targets as the tracking object on the screen. In this case, the target specified as the tracking object is already being tracked at the point when it is specified. Thus, the movement state of the target specified by the user as the tracking object is instantly displayed on the display screen. However, with this configuration a target not displayed as the tracking object on the display screen has to be tracked. Accordingly, this places a higher calculation burden on the tracking device.

The configurations in Patent Literature 4 to 6 involve using information from a point farther in the past than the point when tracking was started, to calculate the movement state for the target specified as the tracking object. Accordingly, with the configurations in Patent Literature 4 to 6, movement information about the tracking object can be obtained from the start of tracking. Consequently, movement information about the tracking object can be displayed on the display screen without a time lag, at the start of tracking of the tracking object. Nevertheless, there is no particular mention made in any of Patent Literature 4 to 6 regarding how data obtained in past scans is stored. Therefore, the amount of data obtained in past scans may end up being very large, which would necessitate a huge memory capacity for the tracking device.

The present invention was conceived in light of the above situation, and it is an object thereof to provide a tracking processing device and a tracking processing method with which time lag from the receipt of a command to track a target until the movement state of this target is estimated more accurately can be reduced, the calculation burden can be reduced, and the memory capacity can be reduced.

(1) To solve the stated problem, the tracking processing device pertaining to an aspect of this present invention includes a tracking information detector, a storage component, and a tracking processor. The tracking information detector is configured to use an echo signal from a target to extract information needed for target tracking. The storage component is configured to store the information extracted in the past and needed for the target tracking. The tracking processor is configured to perform tracking processing on a tracking target selected as a tracking object. The tracking processor is further configured to use the information stored in the storage component to estimate a movement state of the tracking target at a start of tracking of the tracking target.

(2) Preferably, the tracking information detector is further configured to detect information about a tracking representative point of the target as the information. The storage component is further configured to store the information about the tracking representative point. The tracking processor is further configured to use the information about the tracking representative point stored in the storage component to estimate the movement state.

(3) Preferably, the tracking processor is further configured to extract, as a tracking representative point group, tracking representative points of the tracking target at a plurality of points in time, prior to the start of tracking of the tracking target, based on the information about the tracking representative points stored in the storage component. Also, the tracking processor is further configured to use the tracking representative point group to estimate the movement state of the tracking target at a point in time prior to the start of tracking of the tracking target.

(4) Preferably, the tracking processor is further configured to extract the tracking representative point group, using as an origin the tracking representative point of the tracking target at the start of tracking of the tracking target.

(5) Preferably, the tracking processor is further configured to estimate movement of each of the tracking representative points in the tracking representative point group, starting with an oldest tracking representative point. The tracking processor is further configured to use movement estimation result of a newest tracking representative point out of the tracking representative point group to estimate the movement state of the tracking representative point of the tracking target at the start of tracking of the tracking target.

(6) Preferably, the storage component is further configured to store characteristic information related to the target, with the characteristic information being obtained by using the echo signal. The tracking processor is further configured to extract the tracking representative point group based on each information about the tracking representative points, and the characteristic information.

(7) More preferably, the characteristic information includes at least one of shape information about an echo image specified by the echo signal, level of the echo signal, information specifying a state around the target, and an amount of Doppler shift related to the echo signal.

(8) To solve the stated problem, the tracking processing method pertaining to an aspect of this invention includes a tracking information detection step, a storage step, and a tracking processing step. In the tracking information detection step, an echo signal from a target is used to extract information needed for target tracking. In the storage step, the information extracted in the past and needed for target tracking is stored. In the tracking processing step, tracking processing is performed on a tracking target selected as a tracking object. In the tracking processing step, the information stored in the storage component is used to estimate a movement state of the tracking target at a start of tracking of the tracking target.

The present invention provides a tracking processing device and a tracking processing method with which time lag from the receipt of a command to track a target until the movement state of this target is estimated more accurately can be reduced, the calculation burden can be reduced, and the memory capacity can be smaller.

BRIEF DESCRIPTION OF THE DRAWINGS

Referring now to the attached drawings which form a part of this original disclosure:

FIG. 1 is a block diagram of a radar device that includes a tracking processing device pertaining to an embodiment of the present invention;

FIG. 3 is a data table illustrating a tracking file related to a target echo image;

DETAILED DESCRIPTION OF EMBODIMENTS

Figure 1:
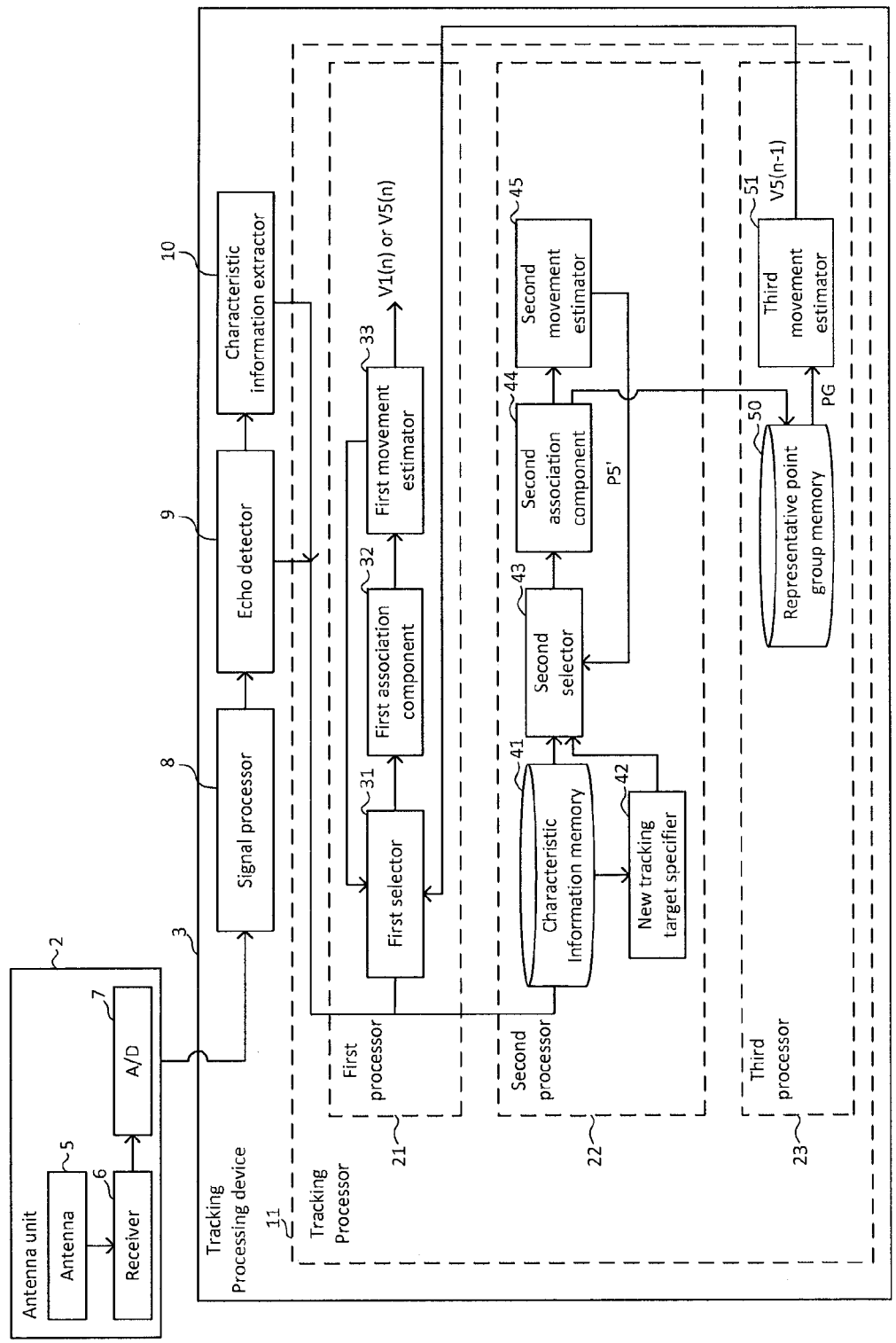
FIG. 1 is

A preferred embodiment will now be explained with reference to the drawings. It will be apparent to those skilled in the art from this disclosure that the following descriptions of the embodiment are provided for illustration only and not for the purpose of limiting the invention as defined by the appended claims and their equivalents. The present invention can be widely applied as a tracking processing device that tracks a target selected as a tracking object. A target set as a tracking object will hereinafter be called a "tracking target." Those portions that are the same or equivalent in the drawings will be numbered the same below and will not be described again.

FIG. 1 is a block diagram of a radar device 1 that includes a tracking processing device 3 pertaining to an embodiment of the present invention. The radar device 1 in this embodiment is a marine radar provided to a fishing boat or other such watercraft. The radar device 1 is mainly used to detect targets such as other vessels. The radar device 1 is configured such that a target selected as a tracking target can be tracked. The radar device 1 is configured so that a plurality of tracking targets can be tracked simultaneously. The radar device 1 is also configured so as to estimate the movement state of a tracking target. In this embodiment, the radar device 1 calculates the estimated speed vector of a tracking target as the above-mentioned movement state. The estimated speed vector is a vector indicating the travel direction and travel speed estimated for the tracking target. Hereinafter a vessel equipped with the radar device 1 will be referred to as the "host vessel."

As shown in FIG. 1, the radar device 1 comprises an antenna unit 2 and the tracking processing device 3.

The antenna unit 2 includes an antenna 5, a receiver 6, and an A/D converter 7.

The antenna 5 is a radar antenna capable of transmitting pulsed radio waves with strong directionality. The antenna 5 is configured so as to receive an echo signal, which is a reflected wave from the target. Specifically, the echo signal of a target is a wave reflected by the target, with respect to a transmitted signal from the antenna 5, out of the signals received by the antenna 5. The radar device 1 measures how long it takes for the echo signal to be received after the transmission of the pulsed wave. This allows the radar device 1 to detect the distance r to the target. The antenna 5 is configured to be capable of rotating 360° in a horizontal plane. The antenna 5 is also configured so as to repeatedly send and receive radio waves while changing the transmission direction of the pulsed waves (while changing the antenna angle). The above configuration allows the radar device 1 to detect targets for 360° on a plane around the host vessel.

In the following description, the operation from the transmission of one pulsed wave until the transmission of the next pulsed wave is called a "sweep." Also, the operation of rotating the antenna 360° while sending and receiving radio waves is called a "scan." Below, a scan at the latest point in time will be referred to as an "n scan," while a scan one prior to the n scan will be referred to as an "n−1 scan." Similarly, a scan m-number prior to the n scan will be referred to as an "n−m scan." n and m here are both natural numbers.

The receiver 6 detects and amplifies the echo signal received by the antenna 5. The receiver 6 outputs the amplified echo signal to the A/D converter 7. The A/D converter 7 samples the analog echo signal and converts it into digital data (echo data) consisting of a plurality of bits. The echo data here includes data that specifies the strength of the echo signal (signal level) received by the antenna 5. The A/D converter 7 outputs the echo data to the tracking processing device 3.

The tracking processing device 3 is configured so as to specify as the tracking target a target selected as the tracking object from among one or more targets, and to perform tracking processing on said tracking target. More specifically, the tracking processing device 3 is configured so as to calculate the estimated speed vector of the tracking target, the estimated position of the tracking target, and so forth.

The tracking processing device 3 comprises a CPU, a RAM, a ROM (not shown), etc. The tracking processing device 3 also comprises software that includes a tracking processing program stored in the ROM.

The above-mentioned tracking processing program is used by the tracking processing device 3 to execute the tracking processing method pertaining to the present invention. The above-mentioned hardware and software are configured so as to operate in conjunction. This allows the tracking processing device 3 to function as a signal processor 8, an echo detector 9, a characteristic information extractor 10, a tracking processor 11, and so on.

The tracking processing device 3 has the signal processor 8, the echo detector (tracking information detector) 9, the characteristic information extractor 10, and the tracking processor 11.

The signal processor 8 receives echo data from the A/D converter 7. The signal processor 8 removes any unnecessary data and any interference component included in the echo data by subjecting the echo data to filtering or the like. The signal processor 8 outputs the processed echo data to the echo detector 9.

The echo detector 9 is configured so as to perform detection of a target echo image, detection of a tracking representative point of a target echo image, detection (extraction) of information needed for target tracking, and detection of a characteristic information related to the target echo image, after each scan. Specifically, the echo detector 9 includes a tracking information detector, a target echo image detector, and a characteristic information extractor.

More specifically, the echo detector 9 finds the distance r to a position corresponding to the echo data based on the read address when the echo data is read out from the signal processor 8. Also, data indicating which direction the antenna 5 is currently facing (the antenna angle θ) is outputted from the antenna 5 to the echo detector 9. With the above configuration, when echo data is read out, the echo detector 9 can acquire the position corresponding to that echo data as polar coordinates of the distance r and the antenna angle θ. The echo detector 9 may also be configured so as to process the echo data while taking it in from the A/D converter 7 in real time. The sweep memory 8 may be eliminated in this case.

The echo detector 9 is configured so as to detect whether or not there is a target present at the position corresponding to the echo data. The echo detector 9 identifies the signal level (that is, the signal strength) at the position corresponding to the echo data. The echo detector 9 determines that a target is present at a position where the signal level is at or above a specific threshold level.

The echo detector 9 then detects a region where the signal level is at or above a specific threshold level as a region where a target echo image is present. In this way, the echo detector 9 detects a target echo image based on echo data. The echo detector 9 then uses the echo data to extract a certain amount of characteristic information related to the target echo image.

Figure 2:
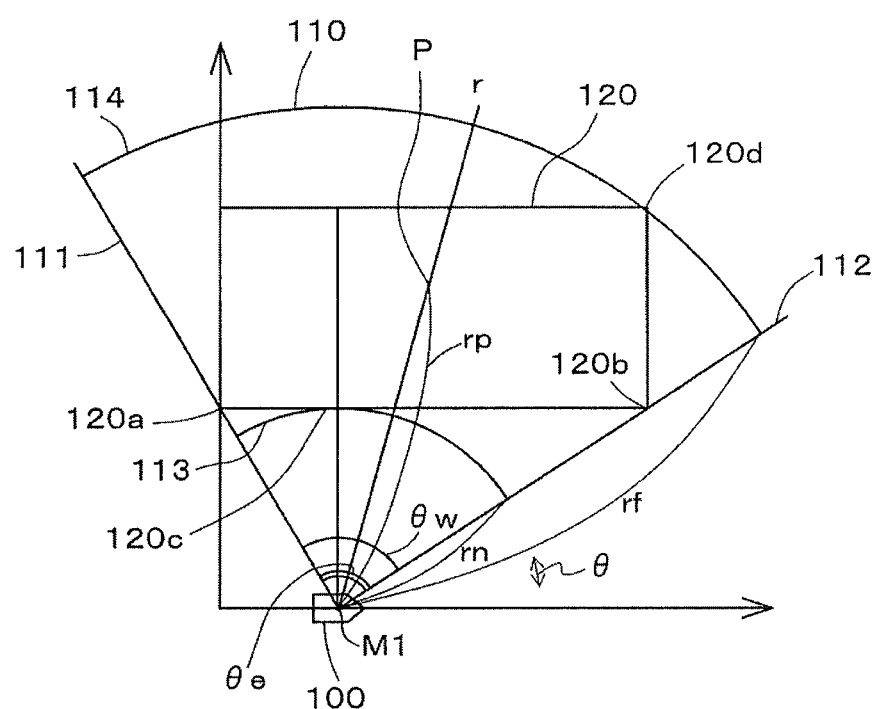
FIG. 2 is a simplified plan view illustrating the relation between the host vessel and a target echo image.

FIG. 2 is a simplified plan view illustrating the relation between a host vessel 100 and a target echo image 120. In FIG. 2, the target echo image 120 is shown as a rectangular image in this example. As shown in FIG. 2, in a polar coordinate system, using the host vessel position M1 as a reference, the linear distance from the host vessel position M1 is shown as the distance r, and the angle around the host vessel position M1 is shown as the angle θ. The echo detector 9 uses an image 110, which is the form of a partial ring-shape centering on the host vessel position M1, in the extraction of the characteristic information about the target echo image 120. This image 110 is an image of a region bounded by a first straight line 111, a second straight line 112, a first arc 113, and a second arc 114.

The first straight line 111 is a line passing through the host vessel position M1 and the point on the rear edge 120a of the target echo image 120 that is closest to the host vessel position M1. The second straight line 112 is a line passing through the host vessel position M1 and the point on the front edge 120b of the target echo image 120 that is closest to the host vessel position M1. The first arc 113 is a circle passing through the portion 120c of the target echo image 120 that is closest to the host vessel position M1, and the center point of the radius of curvature of this circle is the host vessel position M1. The second arc 114 is a circle passing through the portion 120d of the target echo image 120 that is farthest from the host vessel position M1, and is concentric with the first arc 113.

FIG. 3 is a data table illustrating a tracking file related to the target echo image 120. As shown in FIGS. 2 and 3, in this embodiment the tracking file is one in which the following 12 sets of text data related to the target echo image 120 are listed as characteristic information data. Each set of text data is, for example, an amount of data equivalent to one word (a few bits), so the amount of data is small. In this embodiment, the 12 sets of text data consist of data 202 about a distance rp, data 203 about an end angle θe, data 204 about an angle width θw, data 205 about a nearest edge distance rn, data 206 about a farthest edge distance rf, data 207 about a surface area ar, data 208 about a tracking representative point P, data 209 about shape information, data 210 about an echo level, data 211 about peripheral information, data 212 about the amount of Doppler shift, and time data 213.

The distance rp is the linear distance from the host vessel position M1 to the center point of the target echo image 120. Specifically, the distance rp is the linear distance from the host vessel position M1 to the center point of the image 110 in the drawing. In this embodiment, the tracking representative point P is the center point of the image 110 in the drawing. The tracking representative point P is the representative point used in tracking processing, out of the target echo image 120. The data 208 about the tracking representative point P is coordinate data about the tracking representative point P, and is an example of the "information needed for target tracking" in the present invention. The end angle θe is the above-mentioned antenna angle θ at the point when detection of the target echo image 120 ends. The angle width θw is the width in the angle direction around the host vessel position M1 in the image 110. The angle width θw is also the angle formed by the first straight line 111 and the second straight line 112. The nearest edge distance rn is the distance between the host vessel position M1 and the portion 120c of the target echo image 120. The farthest edge distance rf is the distance between the host vessel position M1 and the portion 120d of the target echo image 120. The area ar is the area of the image 110 in the form of a partial ring-shape.

The shape information is information specifying the shape of the target echo image 120, and includes, for example, the width, length, and so forth of the target echo image 120. The echo level indicates the strength of the echo signal that specifies the target echo image 120. The echo peripheral information is information specifying the state around the target echo image 120. The echo peripheral information includes, for example, information specifying the distance between two adjacent target echo images 120. The amount of Doppler shift is the difference between the frequency of a pulsed signal emitted from the antenna 5 and the frequency of the echo signal reflected by the target specified by the target echo image 120. The relative speed of the host vessel and the target can be found from the amount of Doppler shift. The time is the clock time at the point when the target echo image 120 was detected. The data about the target echo image 120 may include an extra data region.

The echo detector 9 extracts data other than the data 207 about the area ar, the data 211 about peripheral information, the data 212 about the amount of Doppler shift, and the time data 213, from the above-mentioned characteristic information data based on the image data for the target echo image 120.

Figure 4:
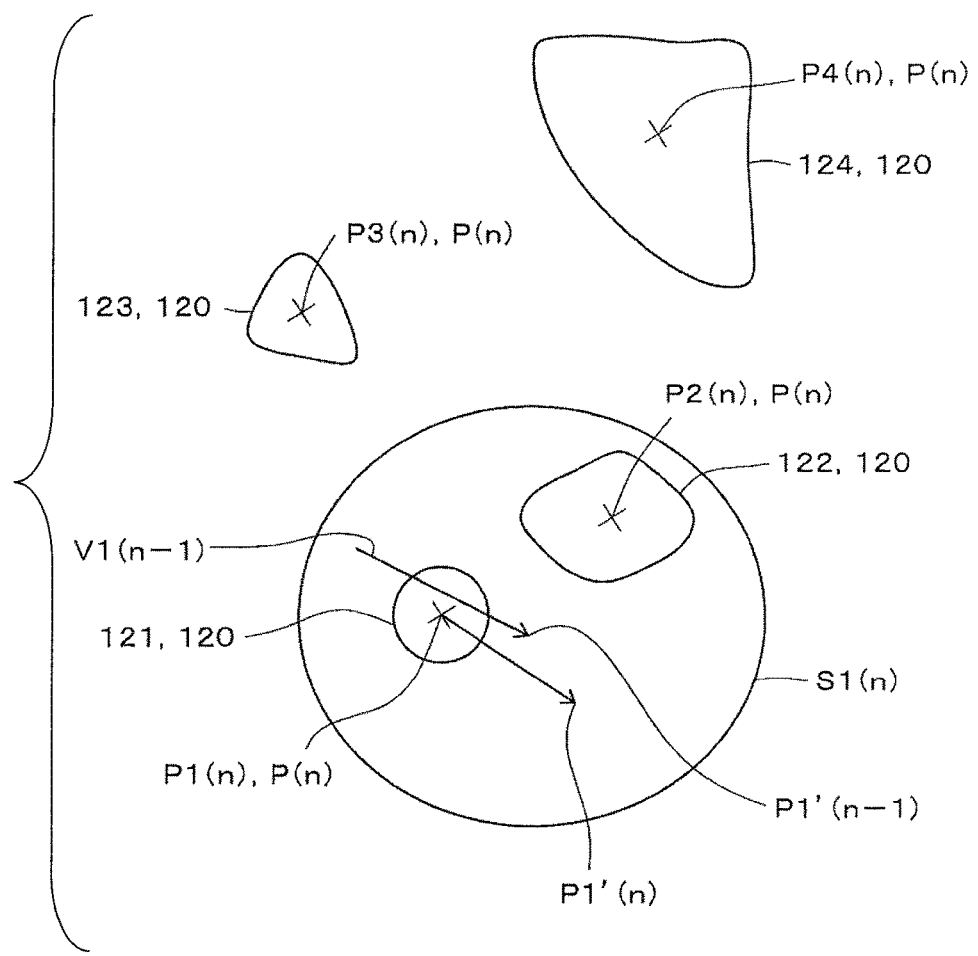
FIG. 4 is a simplified plan view of an example of a target echo image detected by an echo detector.

FIG. 4 shows an example of a plurality of target echo images 120 detected by the echo detector 9. FIG. 4 is a simplified plan view of the target echo images 120 detected by the echo detector 9, and shows each target echo image 120 as seen from above. In FIG. 4, four target echo images 120 (121, 122, 123, and 124) are shown at the n scan time-point as an example. The target echo images 121, 122, and 123 are boats, for example. The target echo image 124 is a ship, for example. The echo detector 9 detects a tracking representative point P1(n) of the target echo image 121, a tracking representative point P2(n) of the target echo image 122, a tracking representative point P3(n) of the target echo image 123, a tracking representative point P4(n) of the target echo image 124 as the tracking representative point P, for example. An example will now be given in which a target specified by the target echo image 121 is the tracking object tracked by the tracking processing device 3 prior to the n scan time-point. When target echo images such as the target echo images 121, 122, 123, and 124 are referred to collectively, they may be referred to as the "target echo images 120."

As shown in FIGS. 1, 3, and 4, the echo detector 9 outputs coordinate data about the tracking representative point P and the detected characteristic information data about each target echo image 120 to the tracking processor 11. The echo detector 9 also outputs image data about each target echo image 120 to the characteristic information extractor 10.

The characteristic information extractor 10 extracts the above-mentioned data 211 about echo peripheral information, the data 212 about the amount of Doppler shift, and the time data 213, based on image data about each target echo image 120, etc. The characteristic information extractor 10 outputs the extracted data 211, 212, and 213 and outputs them to the tracking processor 11.

The tracking processor 11 is configured so as to perform tracking processing on the tracking target selected from among one or more targets. The tracking target is specified, for example, by the operator based on a symbol or the like indicating one or more targets and displayed on a display device (not shown) provided to the radar device 1. The command from the operator to select a tracking target (also called a tracking start command) is issued by the operator by operating an interface device (not shown), for example. This select command may be issued automatically by the tracking processing device 3 so as to select a target for which the nearest edge distance rn from the host vessel position M1 is less than a specific value. The tracking processor 11 is configured so as to quickly start the tracking processing of a new tracking target when a new tracking target has been set.

More specifically, the tracking processor 11 has a first processor 21, a second processor 22, and a third processor 23. In this embodiment, the first processor 21, the second processor 22, and the third processor 23 are configured so as to perform their processing based on an X-Y coordinate system.

The first processor 21 is configured so as to calculate the estimated speed vector $V1(n)$ of the tracking target at the n scan time-point (the latest scan time-point).

The first processor 21 includes a first selector 31, a first association component 32, and a first movement estimator 33.

The first selector 31 is configured so as to set a region for selecting the tracking representative point $P1(n)$ of the tracking target from the plurality of tracking representative points $P(n)$ at the n scan time-point, detected by the echo detector 9. The first selector 31 is connected to the echo detector 9, the characteristic information extractor 10, the first association component 32, the first movement estimator 33, and a third movement estimator 51 (discussed below).

The first selector 31 receives coordinate data about the tracking representative points $P(n)$ of the various target echo images 120 at the n scan time-point, from the echo detector 9. The first selector 31 also receives coordinate data about the estimated position $P1'(n-1)$ of the tracking target from the first movement estimator 33. The estimated position $P1'(n-1)$ is the position specified by the estimated speed vector $V1(n-1)$.

Next, the first selector 31 sets a selection region $S1(n)$ having a specific radius, centering on this estimated position $P1'(n-1)$. FIG. 4 shows an example in which the tracking representative points $P1(n)$ and $P2(n)$ of the target echo images 121 and 122 are included in the selection region S1. The first selector 31 outputs the coordinate data about the tracking representative points $P1(n)$ and $P2(n)$ present in the selection region S1, to the first association component 32.

The first association component 32 calculates the area ar (ar1 and ar2) of each target echo image 120 (121 and 122) within the selection region $S1(n)$. The first association component 32 is an example of the "characteristic information detector" of the present invention. The first association component 32 then identifies the tracking representative point $P1(n)$ from within the selection region $S1(n)$. More specifically, the first association component 32 determines how close the tracking representative points $P1(n)$ and $P2(n)$ within the selection region $S1(n)$ are to the estimated position $P1'(n-1)$. The first association component 32 also compares the similarity between the characteristic information associated with the tracking representative points $P1(n)$ and $P2(n)$ and the characteristic information associated with the tracking representative point $P1(n-1)$. The first association component 32 then determines, as a result of the above determination and comparison, that the point with the highest likelihood of being the tracking representative point $P1(n)$ at the n scan time-point is the tracking representative point $P1(n)$. The first association component 32 outputs the coordinate data about the tracking representative point $P1(n)$ to the first movement estimator 33.

The first movement estimator 33 performs tracking filter processing to calculate the estimated speed vector $V1(n)$ of the tracking representative point $P1(n)$ at the n scan time-point. More specifically, the first movement estimator 33 performs tracking filter processing by using the coordinate data about the tracking representative point $P1(n)$ and the estimated speed vector $V1(n-1)$ at the (n-1) scan time-point. Examples of tracking filters include an α-β filter and a Kalman filter.

By means of the above-mentioned tracking filter processing, the first movement estimator 33 calculates the smooth position, an estimated position $P1'(n)$, and an estimated speed vector $V1(n)$ (smooth speed vector) for the tracking representative point $P1(n)$ at the n scan time-point. In this embodiment, the smooth position of the tracking representative point P1 is shown as being the same as the observed position of the tracking representative point P1. Also, the estimated position $P1'(n)$ is the estimated position at which the tracking representative point P1 will arrive at the (n+1) scan time-point. The first movement estimator 33 outputs coordinate data about the estimated position $P1'(n)$ to the first selector 31. The coordinate data about the estimated position $P1'(n)$ is used in selection processing at the (n+1) scan time-point by the first selector 31. The data about the estimated speed vector $V1(n)$ may be outputted to a display device (not shown). In this case, the estimated speed vector $V1(n)$ will be displayed on this display device.

Meanwhile, a target other than one specified by the target echo image 121 is sometimes selected (tracking is begun) as a new tracking target at the n scan time-point. In this case, the first selector 31 receives from the third movement estimator 51 the movement estimation result prior to the n scan time-point, related to the new tracking target. A target selected as a new tracking target at the n scan time-point will hereinafter be referred to as a "new tracking target."

Figure 5:
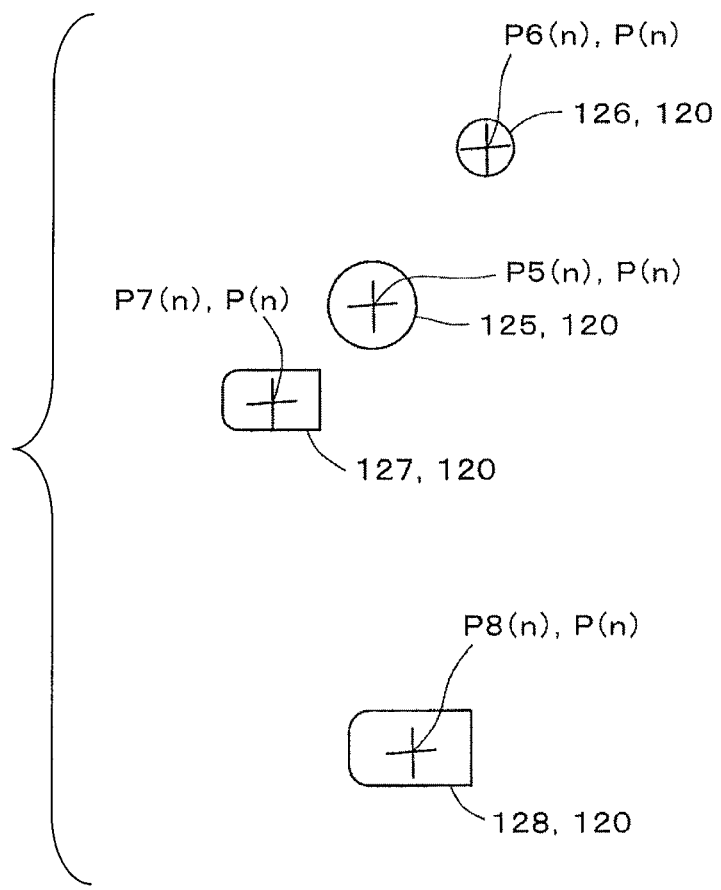
FIG. 5 is a diagram of an example of a target echo image.

More specifically, the second processor 22 and the third processor 23 are actuated when the operator has selected a new tracking target at the n scan time-point. FIG. 5 shows an example of the target echo images 120 (125, 126, 127, and 128). An example will now be described in which a target specified by the target echo image 125 has been selected as the new tracking target.

Referring to FIGS. 1 and 5, the tracking processor 11 uses coordinate data about the tracking representative points P stored in a characteristic information memory 41 (discussed below) to estimate the estimated speed vector $V5(n)$ (movement state) at the start of tracking for the target specified by the target echo image 125.

The second processor 22 is configured so as to specify the tracking representative points $P5(n-1), \ldots, P5(n-5)$ of the target echo image 125 at a time-point prior to the n scan time-point. The third processor 23 uses the tracking representative points $P5(n-1), \ldots, P5(n-5)$ specified by the second processor 22 to calculate the estimated speed vector $V5(n-1)$ of the tracking representative point $P5(n-1)$, using the (n-1) scan time-point as the calculation reference time-point. Consequently, the tracking processor 11 uses the estimated speed vector $V5(n-1)$ to calculate the estimated speed vector $V5(n)$ more accurately and quickly for a new tracking target for which tracking processing has begun at the n scan time-point. The configuration of the second processor 22 and that of the third processor 23 will be described below.

The second processor 22 performs processing so as to follow a time series from the n scan time-point toward a past scan time-point. In this case, the second processor 22 performs the same processing as the first selector 31, first association component 32, and first movement estimator 33 of the first processor 21. Consequently, the second processor 22 specifies the coordinates of the tracking representative point $P5(n-1), \ldots, P5(n-5)$ of the new tracking target.

The second processor 22 has the characteristic information memory (storage component) 41, a new tracking target specifier 42, a second selector 43, a second association component 44, and a second movement estimator 45.

The characteristic information memory 41 is configured so as to store data about characteristic information outputted from the characteristic information extractor 10, data about the area ar (characteristic information) calculated by the first association component 32, and data about characteristic information outputted from the echo detector 9. In this embodiment, a ring buffer is used as the characteristic information memory 41. The characteristic information memory 41 stores coordinate data for the tracking representative point P for all of the target echo images 120 at each time-point from the (n−mt) scan time-point to the n scan time-point. The constant mt is a preset value. In this embodiment, mt is set to 5. The characteristic information memory 41 also holds characteristic information data for all of the target echo images 120 at each time-point from the (n−mt) scan time-point to the n scan time-point. Thus, the characteristic information memory 41 stores coordinate data for the tracking representative points P extracted in the past, etc.

However, as discussed above, the characteristic information data for each target echo image 120 (121 to 128) (including coordinate data for the tracking representative points) is text data. Accordingly, the total amount of characteristic information data for each target echo image 120 at all of the scan time-points from the (n−mt) scan time-point until the n scan time-point is much less than the total amount of image data for each target echo image 120 at all of these scan time-points. This constant mt is appropriately set according to the storage capacity of the characteristic information memory 41. If there is no more storage capacity, the characteristic information memory 41 overwrites the storage region for the information related to the scan time-points prior to the (n−mt) scan time-point with new data to be stored.

The new tracking target specifier 42 is configured so as to set a tracking representative point P5(n) corresponding to the new tracking target if the operator has selected a new tracking target at the n scan time-point. As discussed above, in this embodiment the target specified by the target echo image 125 is selected as the new tracking target. That is, in this embodiment an example is described in which the tracking representative point P5(n) of the target echo image 125 is tracked from the n scan time-point. The operator designates a specific location on the image displayed on the display device (not shown) while referring to this image. Thus, the operator selects the new tracking target specified by the target echo image 125.

In this case, the coordinates specified by the operator will not always completely coincide with the coordinates of the tracking representative point P5(n) of the new tracking target. In view of this, the new tracking target specifier 42 sets the point at the coordinates closest to the coordinates designated by the operator, as the tracking representative point P5(n) of the new tracking target. The new tracking target specifier 42 outputs the coordinate data for the tracking representative point P5(n) to the second selector 43.

Next, the configurations of the second selector 43, the second association component 44, and the second movement estimator 45 will be described. The second selector 43, the second association component 44, and the second movement estimator 45 are configured so as to perform their processing by using the characteristic information data stored in the characteristic information memory 41.

Figure 6A:
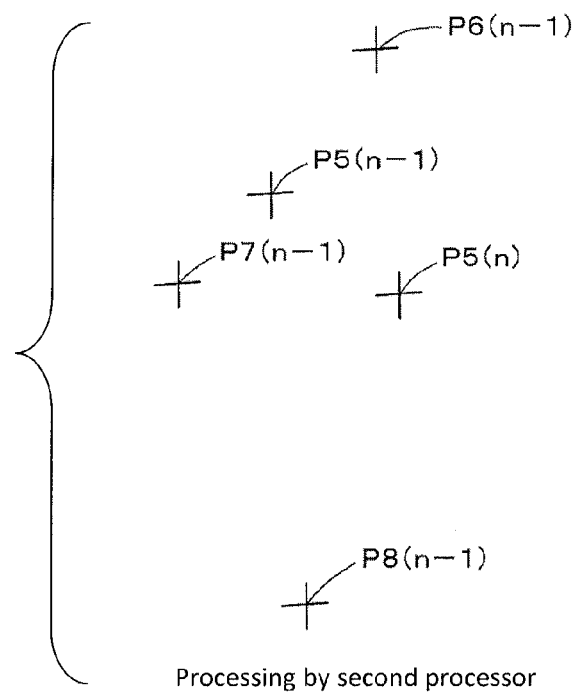
FIGS. 6A and 6B are simplified diagrams illustrating the processing performed by a second processor.

The second selector 43 reads the coordinate data for the tracking representative points P(n−1) {P1(n−1), . . . , P8(n−1)} at the (n−1) scan time-point. Consequently, as shown in FIG. 6A, for example, the tracking representative points P5(n−1), P6(n−1), P7(n−1), and P8(n−1) are disposed around the tracking representative point P5(n). The tracking representative points P1(n−1), . . . , P4(n−1) are farther away from the tracking representative point P5(n−1), and are not depicted in the drawing.

Figure 6B:
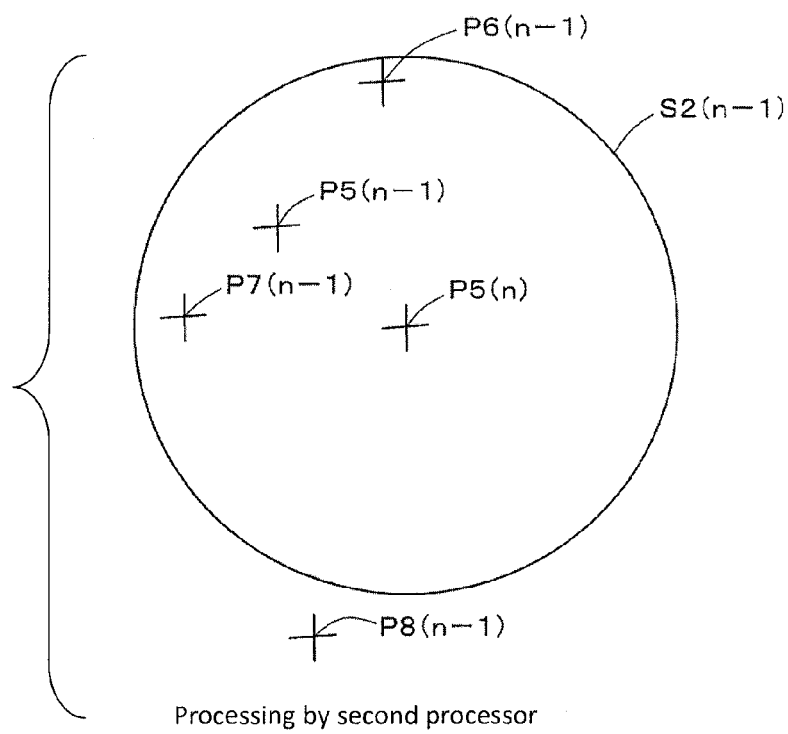

Next, as shown in FIGS. 1 and 6B, the second selector 43 sets the selection region S2(n−1). The selection region S2(n−1) is the region where the tracking representative point P5(n−1) of the new tracking target is estimated to be at the (n−1) scan time-point. The second selector 43 sets the circular selection region S2(n−1), centering on the tracking representative point P5(n). FIG. 6B shows a case in which three tracking representative points tracking representative points P5(n−1), P6(n−1), and P7(n−1) are present in the selection region S2(n−1).

The second association component 44 is configured so as to identify the tracking representative point P5(n−1) from among the plurality of tracking representative points P5(n−1), P6(n−1), and P7(n−1) at the (n−1) scan time-point. More specifically, the second association component 44 determines how close the tracking representative points P5(n−1), P6(n−1), and P7(n−1) in the selection region S2(n−1) are to the tracking representative point P5(n). The second association component 44 also reads from the characteristic information memory 41 the characteristic information data associated with the tracking representative points P5(n−1), P6(n−1), and P7(n−1) in the selection region S2(n−1).

Figure 7A:
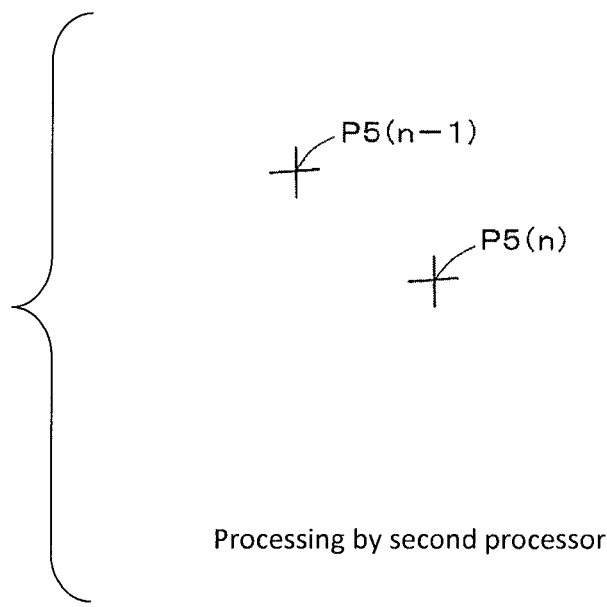
FIGS. 7A and 7B are a continuation of FIG. 6B, and are simplified diagrams illustrating the processing performed by the second processor.

The second association component 44 comprises the characteristic information associated with the tracking representative points P5(n−1), P6(n−1), and P7(n−1) with the characteristic information associated with the tracking representative point P5(n). The second association component 44 then determines, as a result of the above determination and comparison, that the point with the highest likelihood of being the tracking representative point P5(n−1) at the (n−1) scan time-point is the tracking representative point P5(n−1). FIG. 7A shows the state when the tracking representative point P5(n) and the tracking representative point P5(n−1) have been associated with each other. The second association component 44 outputs coordinate data about the tracking representative point P5(n−1) at the (n−1) scan time-point to the second movement estimator 45 and a representative point group memory 50 (discussed below) of the third processor 23.

Figure 7B:
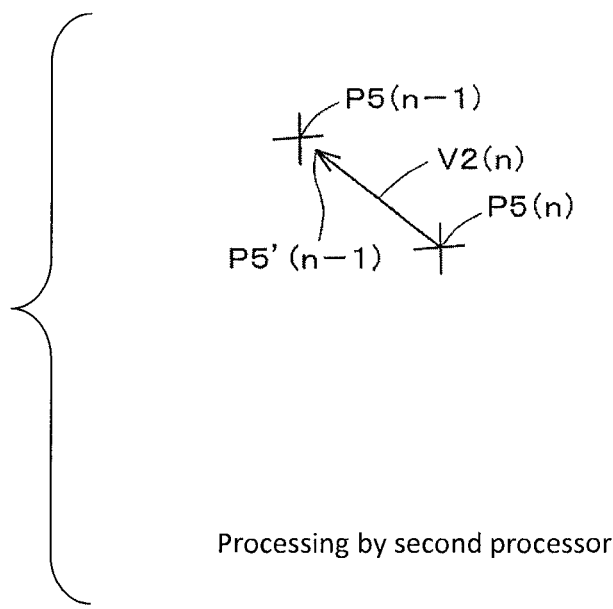

As shown in FIGS. 1 and 7, the second movement estimator 45 then calculates the reverse direction vector V2(n) (average speed vector), using the n scan time-point as the computational reference time-point. The reverse direction vector V2 is calculated in order to specify the position where the tracking representative point P5 is estimated to be at one scan point farther back in the past than the scan point serving as the calculation reference for the reverse direction vector V2.

More specifically, the second movement estimator 45 performs tracking filter processing. Examples of tracking filters include an α-β filter and a Kalman filter, just as with the tracking filter of the first movement estimator 33.

The second movement estimator 45 refers to the coordinates of the tracking representative point P5(n) and the coordinates of the tracking representative point P5(n−1). The second movement estimator 45 then uses a specific filter coefficient to calculate the reverse direction vector V2(n). The origin of the reverse direction vector V2(n) is the tracking representative point P5(n), and the end point of the reverse direction vector V2(n) is located between the tracking representative point P5(n) and the tracking representative point P5(n−1). The end point of the reverse direction vector V2(n) is the smooth position P5'(n−1). The coordinate data for the smooth position P5'(n−1) is outputted to the second selector 43.

Next, the second selector 43 reads the coordinate data for each tracking representative point P(n−2) at the (n−2) scan time-point from the characteristic information memory 41. Consequently, the tracking representative points P5(n−2), P6(n−2), and P7(n−2) of the (n−2) scan time-point are disposed around the smooth point P5'(n−1).

Figure 8A:
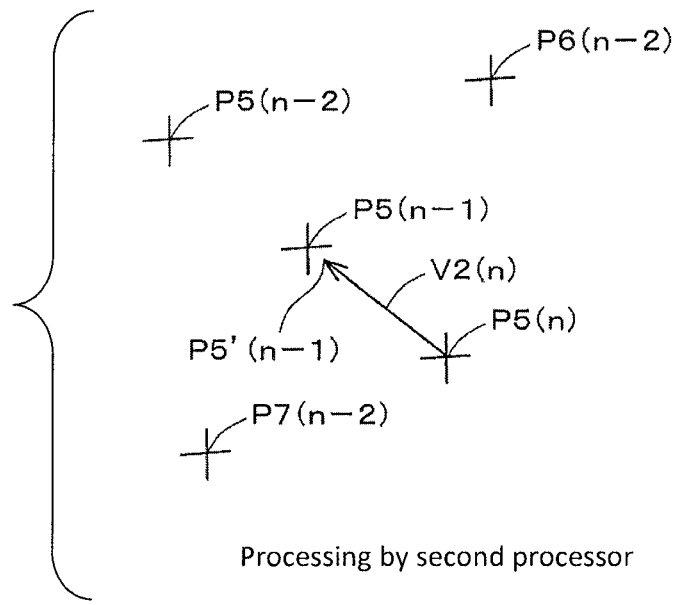
FIGS. 8A and 8B are a continuation of FIG. 7B, and are simplified diagrams illustrating the processing performed by the second processor.
Figure 8B:
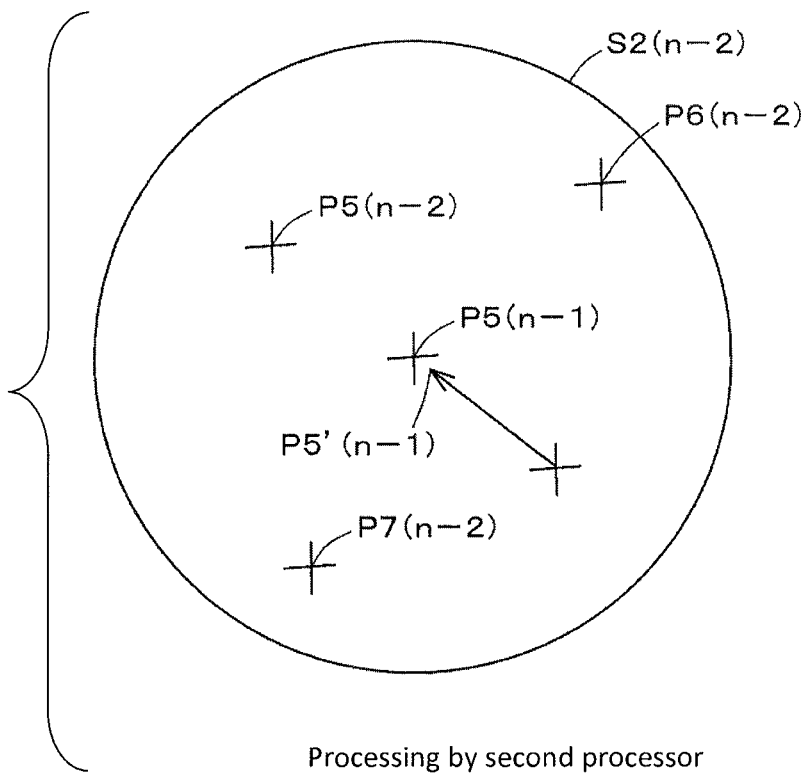

Then, as shown in FIGS. 1 and 8B, the second selector 43 sets the selection region S2(n−2), centering on the smooth point P5'(n−1).

The second association component 44 identifies the tracking representative point P5(n−2) from among the plurality of tracking representative points P5(n−2), P6(n−2), and P7(n−2) in the selection region S2(n−2). More specifically, the second association component 44 determines how close the tracking representative points P5(n−2), P6(n−2), and P7(n−2) in the selection region S2(n−2) are to the smooth point P5'(n−1). The second association component 44 also reads from the characteristic information memory 41 the characteristic information data associated with the tracking representative points P5(n−2), P6(n−2), and P7(n−2) in the selection region S2(n−2). The second association component 44 compares the similarity between the characteristic information associated with the tracking representative points P5(n−2), P6(n−2), and P7(n−2) with the characteristic information associated with the tracking representative point P5(n−1).

Figure 9A:
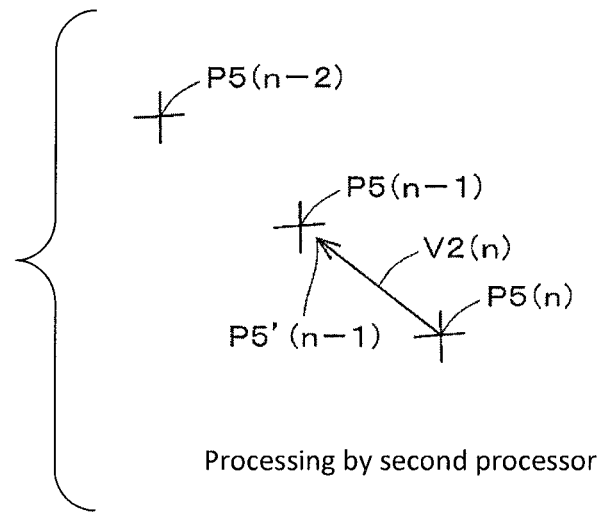
FIGS. 9A and 9B are a continuation of FIG. 8B, and are simplified diagrams illustrating the processing performed by the second processor.

The second association component 44 then determines, as a result of the above determination and comparison, that the point with the highest likelihood of being the tracking representative point P5(n−2) at the (n−2) scan time-point is the tracking representative point P5(n−2). FIG. 9A shows the state when the smooth point P5'(n−1) of the tracking representative point P5(n) and the tracking representative point P5(n−2) have been associated with each other. The second association component 44 outputs coordinate data about the tracking representative point P5(n−2) to the second movement estimator 45 and the representative point group memory 50 of the third processor 23.

Figure 9B:
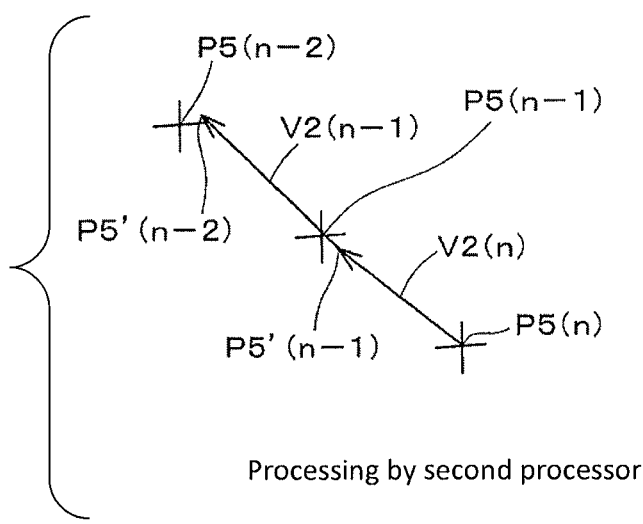

As shown in FIGS. 1 and 9B, the second movement estimator 45 calculates the reverse direction vector V2(n−1) by performing tracking filter processing. In this case, the second movement estimator 45 uses the end point of the reverse direction vector V2(n) as the smooth point P5'(n−1). The tracking filter of the second movement estimator 45 reads the coordinate data of the tracking representative point P5(n−2). Consequently, the second movement estimator 45 calculates the reverse direction vector V2(n−1). The second movement estimator 45 outputs the coordinate data of the smooth point P5'(n−2), which is the end point of the reverse direction vector V2(n−1), to the second selector 43.

The second processor 22 then repeats the same processing as that shown in FIGS. 8A to 9B, until the tracking representative point P5(n−5) at the (n−5) scan time-point is detected.

Figure 10:
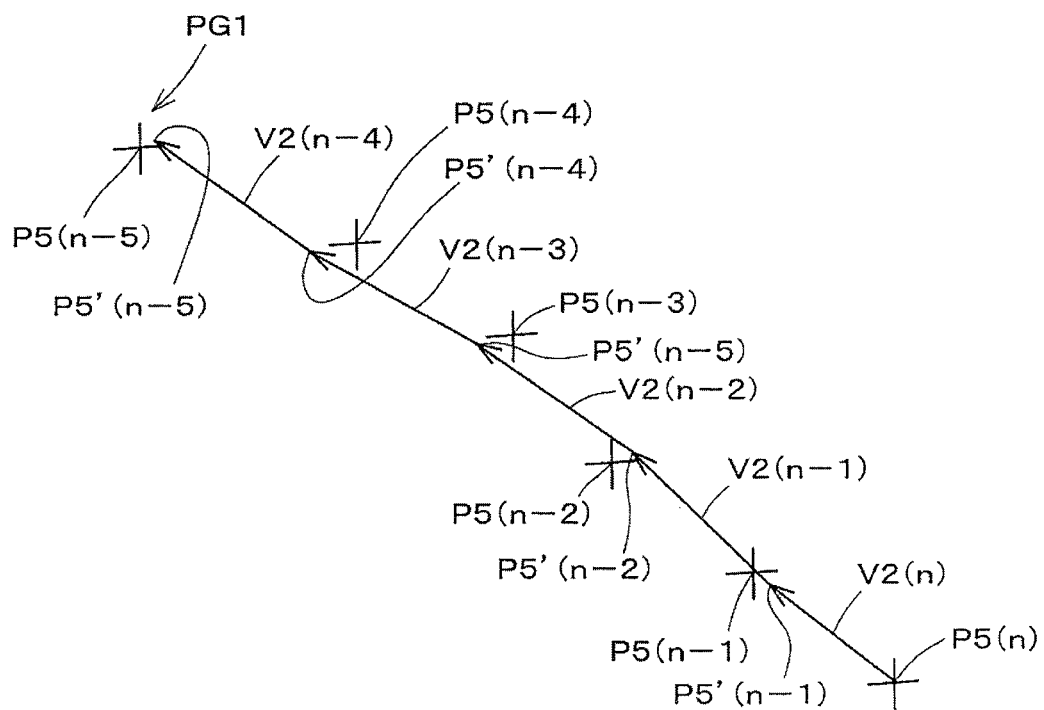
FIG. 10 is a simplified diagram illustrating the processing result of the second processor.

Consequently, as shown in FIG. 10, the second processor 22 successively calculates the tracking representative point P5(n−3), the reverse direction vector V2(n−2), the tracking representative point P5(n−4), the reverse direction vector V2(n−3), and the tracking representative point P5(n−5).

With the above configuration, the second association component 44 outputs the coordinate data of the tracking representative points P5(n−1), P5(n−2), P5(n−3), P5(n−4), and P5(n−5) to the representative point group memory 50.

Specifically, the second processor 22 detects the coordinates of the tracking representative points P5(n−1), . . . , P5(n−5) at the plurality of scan time-points that are farther in the past than the n scan time-point. Thus, the second processor 22 specifies a tracking representative point group PG1 consisting of the plurality of tracking representative points P5(n−1), . . . , P5(n−5), for a new tracking target.

In this case, the second processor 22 selects the tracking representative point group PG1, using as the origin the tracking representative point P5(n) at the n scan time-point when the new tracking target was selected. That is, the second processor 22 calculates the tracking representative points P5(n−1), . . . , P5(n−5) at a plurality of n scan time-points, based on the coordinate data for the tracking representative point P stored in the characteristic information memory 41.

The data of the tracking representative point group PG1 is referred to by the third processor 23. The third processor 23 is configured so as to use the tracking representative point group PG1 for the new tracking target to estimate the movement of the tracking representative point P5 of the new tracking target prior to the n scan time-point. That is, the third processor 23 is configured so as to estimate at the n scan time-point the movement of the new tracking target at a time-point earlier than the n scan time-point.

Figure 11:
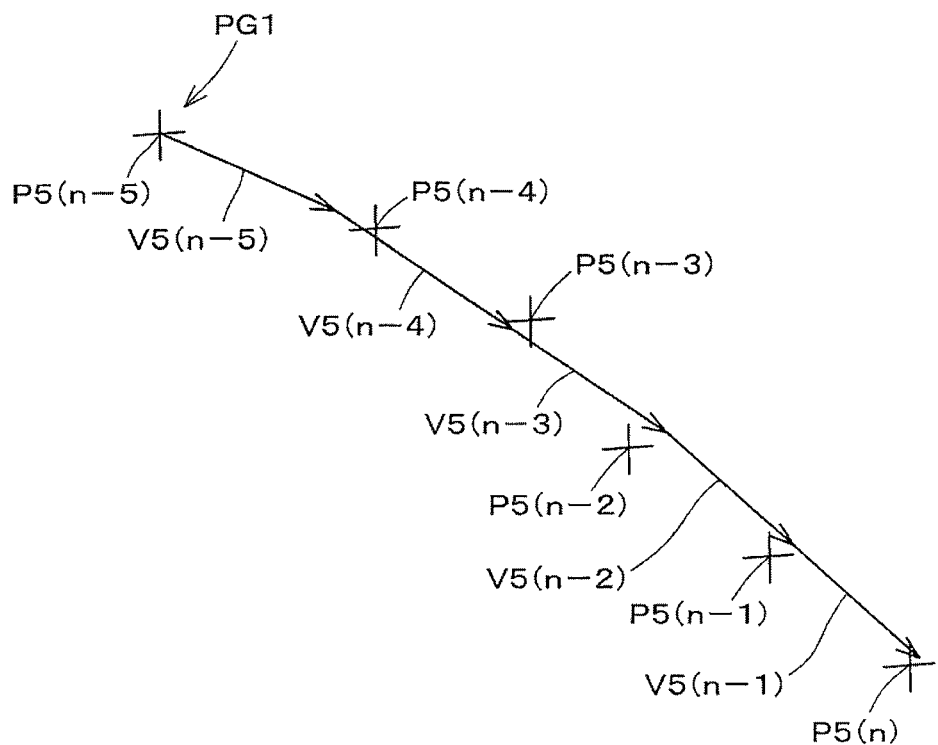
FIG. 11 is a simplified diagram illustrating the processing performed by a third processor.

FIG. 11 is a simplified diagram illustrating the processing performed by the third processor 23. The coordinates of the tracking representative points P5(n), . . . , P5(n−5) in FIG. 11 are the same as the coordinates of the tracking representative points P5(n), . . . , P5(n−5) at the various scan time-points in FIG. 10.

As shown in FIGS. 1 and 11, the third processor 23 is configured so as to estimate the speed vector V5(n−1) of the new tracking target at the (n−1) scan time-point, at the n scan time-point when the new tracking target was selected. The third processor 23 has the representative point group memory 50 and the third movement estimator 51.

The third movement estimator 51 is configured so as to perform tracking filter processing. Examples of tracking filters include an α-β filter and a Kalman filter, just as with the tracking filter of the first movement estimator 33.

The third movement estimator 51 reads from the representative point group memory 50 the coordinate data of the tracking representative point P5(n−1), . . . , P5(n−5). The third movement estimator 51 uses this coordinate data to estimate, along a positive time series, the movement of the new tracking target at a time-point earlier than the n scan time-point. The "positive time series" here refers to a time series facing the n scan time-point from a time-point prior to the n scan time-point.

The third movement estimator 51 first refers to the coordinate data of the tracking representative point P1 at the oldest time-point in the tracking representative point group PG1, and then at the next oldest time-point. Specifically, in this embodiment, the third movement estimator 51 refers to the coordinate data of the tracking representative point P1(n−5) and to the coordinate data of the tracking representative point P1(n−4).

In this case, the third movement estimator 51 uses the coordinates of the tracking representative point P5(n−5) as the initial smooth position. The tracking filter of the third movement estimator 51 reads the coordinate data of the tracking representative point P5(n−4). The third movement estimator 51 thus calculates the positive direction vector V5(n−5). The origin of the positive direction vector V5(n−5) is the tracking representative point P5(n−5), and the end point of the positive direction vector V5(n−5) is located between the tracking representative points P5(n−5) and P5(n−4).

Next, the third movement estimator 51 calculates the positive direction vector V5(n−4) by performing tracking filter processing. In this case, the third movement estimator 51 uses the end point of the positive direction vector V5(n−5) as the smooth position. The tracking filter of the third movement estimator 51 reads the coordinate data of the tracking representative point P5(n−3). The third movement estimator 51 thus calculates the positive direction vector V5(n−4).

Just as discussed above, the third movement estimator 51 calculates the positive direction vector V5(n−3) by performing tracking filter processing. In this case, the third movement estimator 51 uses the end point of the positive direction vector V5(n−4) as the smooth position. The third movement estimator 51 also inputs coordinate data of the tracking representative point P5(n−2) to the tracking filter. The second movement estimator 45 thus calculates the positive direction vector V5(n−3).

Just as discussed above, the third movement estimator 51 calculates the positive direction vectors V5(n−2) and V5(n−1). In calculating the positive direction vector V5(n−1), the third movement estimator 51 uses the coordinate data for the tracking representative point P5(n).

The third movement estimator 51 outputs the positive direction vector V5(n−1) to the first selector 31 as the estimated speed vector V5(n−1) of the tracking representative point P5(n−1) at the (n−1) scan time-point.

Figure 12:
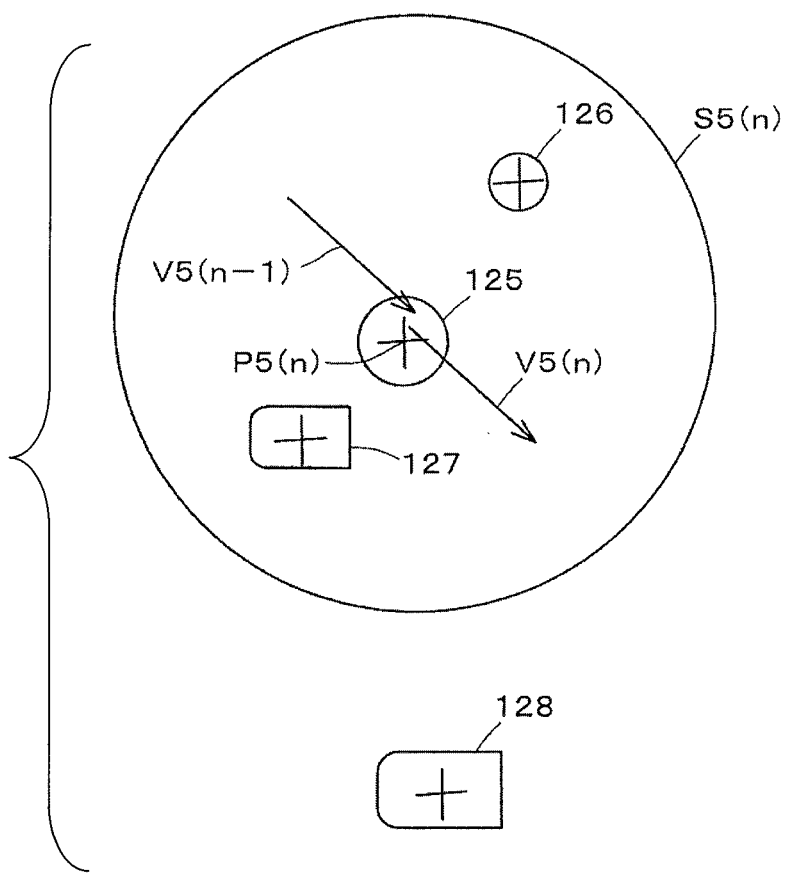
FIG. 12 is a simplified diagram illustrating the tracking processing for a new tracking target at the point of the n scan.

The first selector 31 then performs the same tracking processing as the tracking processing related to the above-mentioned tracking representative point P1(n). More specifically, as shown in FIGS. 4 and 12, the first selector 31 uses the estimated speed vector V5(n−1) to set the selection region S5(n). The first association component 32 then detects the tracking representative point P5(n) from within the selection region S5(n). Next, the first movement estimator 33 performs tracking filter processing using the coordinate data for the tracking representative point P5(n) and the data for the estimated speed vector V5(n−1). Consequently, the first movement estimator 33 calculates the estimated speed vector V5(n) of the tracking representative point P5(n).

As discussed above, the third processor 23 calculates the estimated speed vector V5(n−1) at the (n−1) scan time-point for the tracking representative point P5(n) of the new tracking target that had not undergone tracking processing prior to the n scan time-point. Specifically, the third processor 23 estimates the movement state (positive direction vector V5) of the tracking representative points P5(n−5), . . . , P5(n−1), in order starting from the tracking representative point P5(n−5), which is the oldest point of the tracking representative point group PG1. The third processor 23 then calculates the estimated speed vector V5(n−1) for the tracking representative point P5(n−1), which is the newest point of the tracking representative point group PG1. The first processor 21 uses this estimated speed vector V5(n−1) to estimate the estimated speed vector V5(n) of the tracking representative point P5(n) at the n scan time-point when the new tracking target was selected.

As a result of the above processing performed by the tracking processing device 3, after a new tracking target has been selected, the estimated speed vector V5(n) of the tracking representative point P5(n) of the new tracking target can be quickly and more accurately estimated. As a result, the tracking processing device 3 can perform stable tracking processing on the new tracking target.

If the tracking processing of a new tracking target were performed only based on information from after the time-point when the new tracking target was selected, then the tracking processing device would need a long time to accurately calculate the estimated speed vector of the new tracking target. Accordingly, there is the risk that the tracking processing device will mistake noise originating in clutter, etc., as a new tracking target while the estimated speed vector of the new tracking target is being accurately estimated. As a result, the tracking processing device may not be able to perform accurate tracking processing.

As described above, when a new tracking target has been selected at the n scan time-point by the tracking processing device 3, the third processor 23 of the tracking processor 11 uses information for the tracking representative points P5(n−1), . . . , P5(n−5) of the tracking target at a plurality of time-points in the past. The third processor 23 uses this information, which is necessary for tracking a new tracking target, to calculate the estimated speed vector V5(n) of the tracking representative point P5(n) of the new tracking target. Consequently, even immediately after a new tracking target has been selected as the tracking target, the tracking processor 11 can obtain data about the estimated speed vector V5(n−1) at a past time-point for the new tracking target. Thus, the tracking processor 11 can more accurately and quickly estimate the estimated speed vector V5(n) at the n scan time-point.

Furthermore, the tracking processing device 3 does not perform tracking processing of the new tracking target until this new tracking target is selected. Therefore, the tracking processing device 3 does not need to perform tracking filter processing on the new tracking target before it has been selected as the tracking object, nor is it necessary to store the results of tracking filter processing. Data used for calculating the estimated speed vector V5(n−1) at the (n−1) scan time-point, such as data for specifying the tracking representative point P at a point in the past, is stored in the characteristic information memory 41. This data is text data, and does not take up much space. Therefore, much less memory capacity is needed for the tracking processor 11 than when image data for the target echo image 120 is stored in the characteristic information memory 41 at each scan time-point. Furthermore, the above-mentioned text data is used to perform processing to specify the tracking representative points P5(n−1), . . . , P5(n−5) at various time-points in the past (specification processing), and processing to calculate the estimated speed vector V5(n−1) at a time-point in the past (calculation processing), for the new tracking target. Thus, the tracking processor is subjected to much less of a calculation burden than when the specification processing and calculation processing are performed using image data.

Therefore, when the tracking processing device 3, time lag from the receipt of a command to track a tracking target until the movement state of this tracking target is estimated more accurately can be reduced, the calculation burden can be reduced, and the memory capacity can be smaller.

Also, with the tracking processing device 3, the tracking processor 11 uses the calculated tracking representative point group PG 1 to estimate the movement state of a new tracking target at a point prior to the start of tracking of the new tracking target. Consequently, even immediately after the start of tracking of a new tracking target, the tracking processor 11 can obtain information about the tracking representative points P5(n−1), . . . , P5(n−5) of the new tracking target at a plurality of time-points in the past. Thus, the tracking processor 11 can obtain the same information as what underwent tracking processing at a point prior to the start of tracking, at the start of tracking processing, for information about the new tracking target. This allows the movement of a new tracking target to be estimated more accurately and quickly.

Also, with the tracking processing device 3, the tracking processor 11 extracts the tracking representative point group PG1, using the tracking representative point P5(n) of the new tracking target as the origin, at the n scan time-point when the new tracking target was selected. This allows the tracking processor 11 to clearly associate the tracking representative point group PG1 of the new tracking target with the tracking representative point P5(n) at the most recent time-point (the n scan time-point). Consequently, the tracking processor 11 can more accurately extract the tracking representative point group PG1 from among numerous tracking representative points. Thus, the tracking processor 11 can more accurately estimate movement information about the new tracking target.

Also, with the tracking processing device 3, the third processor 23 estimates the movement of the tracking representative points P5 successively starting from the tracking representative point P5(n−5), which is the oldest time-point of the tracking representative point group PG1. The first processor 21 uses the estimated speed vector V5(n−1) of the tracking representative point P5(n−1), which is the newest time-point of the tracking representative point group PG1. The first processor 21 uses this estimated speed vector V5(n−1) to calculate the estimated speed vector V5(n) at the start of tracking of the new tracking target. Thus, tracking processing is performed along a positive time series, going from the past toward the n scan time-point, for the tracking representative points P5(n−5), . . . , P5(n−1) of the tracking representative point group PG1. Consequently, the tracking processor 11 can calculate the estimated speed vector V5(n) at the same accuracy as when the tracking representative points P5 of the new specified target were tracked, from the time-point when the tracking representative point P1(n−5) of the tracking representative point group PG1 was observed.

Also, with the tracking processing device 3, the characteristic information memory 41 stores characteristic information about a target specified by each target echo image 120. The tracking processor 11 is configured so as to extract the tracking representative point group PG1 of each target echo image 125, based on the above-mentioned characteristic information and the coordinate data for the tracking representative points P of the target echo images 120. Thus, the tracking processor 11 uses not only coordinate information about the tracking representative points P5, but also other characteristic information associated with the tracking representative points P5 to detect the tracking representative points P5. Consequently, the tracking processor 11 can more accurately specify the tracking representative points P5(n−5), . . . , P5(n−1) of a new tracking target in a state in which the effect of the presence of observational error in the echo data and the presence of other targets is suppressed.

Also, with the tracking processing device 3, the above-mentioned characteristic information includes at least one of the following: shape information about a target echo image 120, the level of the echo signal specifying the target echo image 120, information specifying the state around the target specified by each echo image 120, and the amount of Doppler shift related to the echo signal. The second processor 22 of the tracking processor 11 can use this characteristic information to more accurately specify the tracking representative points P5(n−5), . . . , P5(n−1) of the new tracking target.

Also, with the tracking processing device 3, the new tracking target specifier 42 sets the tracking representative point having coordinates closest to the coordinates designated by the operator, etc., as the tracking representative points P5(n) of the new tracking target. This simple configuration allows the tracking processor 11 to reliably identify the tracking representative points P5(n) of a new tracking target.

The tracking processor 11 also sets the center point of the target echo images 120 as the tracking representative point P5(n). If an edge, such as the front edge, or the host vessel were set as the tracking representative point out of the target echo images, there would be a high probability that noise attributable to surface waves, clatter, or the like would be present near the tracking representative point. Therefore, if a new specified target is selected by the operator, there is the risk that the tracking processor will mistake a point in the above-mentioned noise for a tracking representative point. If a misdetection such as this should occur, the tracking processor will end up performing tracking processing on the noise, and the new tracking target cannot be tracked.

In contrast, with the tracking processing device 3, the echo detector 9 sets the center point of the target echo images 120 (the images 110) as the tracking representative point P5(n). In this case, no noise attributable to surface waves, clatter, or the like is present near the tracking representative point P5(n). Therefore, if a new specified target is selected by the operator, the tracking processor 11 can properly detect a point in the target echo images 120 of the new tracking target as the tracking representative point P5(n). This allows the tracking processor 11 to reliably track a new tracking target.

An embodiment of the present invention was described above, but the present invention is not limited to or by the above embodiment, and various modifications are possible without departing from the gist of the invention. For example, the following changes may be made.

(1) In the above embodiment, an example was described in which the tracking processing device used coordinate information about a tracking representative point as the information needed for target tracking (the information stored in the characteristic information memory), but this is not the only option. For instance, information other than coordinate information about a tracking representative point may be used as the information needed for target tracking.

(2) In the above embodiment, an example was described in which the tracking processing device detected a tracking representative point and characteristic information for all of the target echo images detected by the echo detector, but this is not the only option. For example, the tracking processing device may detect the characteristic information and the tracking representative points for just those target echo images near the host vessel position, out of the target echo images detected by the echo detector.

(3) In the above embodiment, an example was described in which the second processor detected the tracking representative point of a new tracking target at every scan time-point. However, this is not the only option. For example, the second processor may specify the tracking representative point for a scan time-point when it is determined that no tracking representative point that is suited to being the tracking representative point of a new tracking target is present at a given scan time-point. In this case, the second processor specifies the tracking representative point of the new tracking target from among a plurality of tracking representative points at a scan time-point one farther back in the past from the above-mentioned given scan time-point.

(4) In the above embodiment, an example was described in which the estimated speed vector of a new tracking target at the (n−1) scan time-point was calculated by using the tracking representative points from the (n−5) scan time-point to the (n−1) scan time-point, and with a constant mt of 5. However, this is not the only option. For example, the constant mt may be set to a larger value. This allows the tracking processor to estimate the movement state prior to the n scan time-point more accurately for a new tracking target.

(5) In the above embodiment, an example was described in which the center point for target echo images was used as the tracking representative point. However, this is not the only option. For example, the nearest edge point, which is the point closest to the host vessel out of the target echo images, may be used as the tracking representative point.

(6) In the above embodiment, an example was described in which the tracking processor had a first processor, a second processor, and a third processor, but this is not the only option. For example, the first processor of the tracking processor may perform the same processing as that of the second and third processors. In this case, the second and third processors are eliminated. In addition, the combination of function blocks described in the above embodiment is not limited to the example given, and the functions realized by the above-mentioned function blocks may be realized by other combinations of function blocks.

(7) In the above embodiment, an example was described in which the tracking representative point was specified by using likelihood determination in association processing. However, this is not the only option. For example, the association component may simply determine the tracking representative point to be the point closest to the center of the selection region in association processing.

(8) In the above embodiment, an example was described in which the tracking processing device was a tracking processing device used for a watercraft. However, the present invention is not limited to a tracking processing device used for a watercraft, and can also be applied to a tracking processing device used for some other kind of moving vehicle.

The present invention can be widely applied as a tracking processing device and a tracking processing method.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only a preferred embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the embodiment according to the present invention are provided for illustration only, and not for the purpose of limiting the invention as defined by the appended claims and their equivalents.

What is claimed is:

1. A tracking processing device disposed on a host vessel, the tracking processing device comprising:
   a tracking information detector configured:
      to receive a radar echo signal reflected from a target as a result of a radar signal striking the target,
      to detect information about a tracking representative point of the target, and
      to extract from the radar echo signal the information for tracking the target;
   a storage configured to store the information about the tracking representative point for tracking the target; and
   processing circuitry configured:
      to select the target as a tracking object,
      to estimate, based on the information about the tracking representative point stored in the storage, a movement state of the tracking object at a start of tracking of the tracking object while refraining from estimating the movement state of the target prior to the start of the tracking of the target as the tracking object,
      to determine,
         as a tracking representative point group, tracking representative points of the target at a plurality of points in time, prior to the start of tracking of the tracking object, based on the information about the tracking representative points stored in the storage, and
         the tracking representative point group using as an origin the tracking representative point of the tracking target at the start of tracking of the tracking object, and
      to estimate:
         a first movement state representing the movement state of the tracking object at a point in time prior to the start of tracking of the tracking object based on the tracking representative point,
         a second movement state representing the movement state of the tracking object at each of the tracking representative points in the tracking representative point group, starting with an oldest tracking representative point, and
         a third movement state representing the movement state of the tracking object at the start of tracking of the tracking object based on a newest tracking representative point out of the tracking representative point group, and to display information representing a physical movement of the tracking object with respect to the host vessel based on at least one of the first, second and third movement states of the tracking object.

2. The tracking processing device according to claim 1, wherein
   the storage is further configured to store characteristic information related to the target, with the characteristic information being obtained by using the radar echo signal, and
   the processing circuitry is further configured to determine the tracking representative point group based on each information about the tracking representative points, and the characteristic information.

3. The tracking processing device according to claim 2, wherein
   the characteristic information includes at least one of shape information about an echo image specified by the radar echo signal, level of the radar echo signal, information specifying a state around the target, and an amount of Doppler shift related to the radar echo signal.

4. A tracking processing method for a host vessel, the tracking processing method comprising:
   a tracking information detection process which operates processing circuitry:
      to receive a radar echo signal from a target as a result of a radar signal striking the target,
      to detect information about a tracking representative point of the target, and to extract from the radar echo signal the information for tracking the target;

a storage process which stores the information about the tracking representative point for tracking the target in a storage; and a tracking process which operates the processing circuitry:

to select the target as a tracking object, to estimate, based on the information about the tracking representative point stored in the storage, a movement state of the tracking object at a start of tracking of the tracking object while refraining from estimating the movement state of the target prior to the start of the tracking of the target as the tracking object, to determine, as a tracking representative point group, tracking representative points of the target at a plurality of points in time, prior to the start of tracking of the tracking object, based on the information about the tracking representative points stored in the storage component, and the tracking representative point group using as an origin the tracking representative point of the tracking target at the start of tracking of the tracking object, and to estimate:

a first movement state representing the movement state of the tracking object at a point in time prior to the start of tracking of the tracking object based on the tracking representative point, a second movement state representing the movement state of the tracking object at each of the tracking representative points in the tracking representative point group, starting with an oldest tracking representative point, and a third movement state representing the movement state of the tracking object at the start of tracking of the tracking object based on a newest tracking representative point out of the tracking representative point group; and to display information representing a physical movement of the tracking object with respect to the host vessel based on at least one of the first, second and third movement states of the tracking object.

5. The tracking processing method according to claim 4, wherein the storage process further stores characteristic information related to the target, with the characteristic information being obtained by using the radar echo signal, and the tracking process is further configured to determine the tracking representative point group based on each information about the tracking representative points, and the characteristic information.

6. The tracking processing method according to claim 5, wherein the characteristic information includes at least one of shape information about an echo image specified by the radar echo signal, level of the radar echo signal, information specifying a state around the target, and an amount of Doppler shift related to the radar echo signal.

* * * * *